Dec. 19, 1950  D. M. CARGILL  2,534,951
UNIVERSAL ELECTRICAL APPARATUS
Filed Sept. 19, 1945
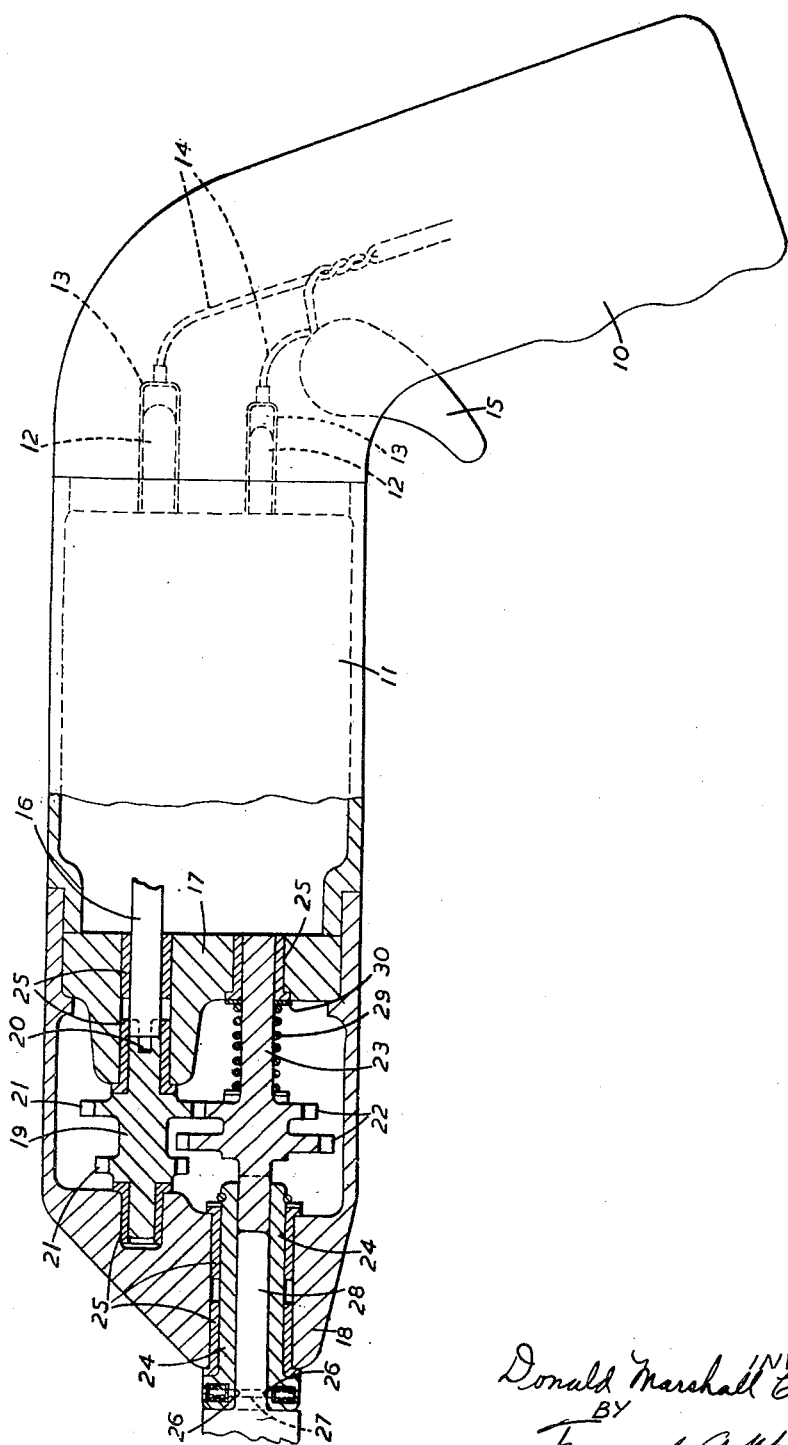
INVENTOR,
Donald Marshall Cargill,
BY
Frank S. Appleman,
ATTORNEY.

Patented Dec. 19, 1950

2,534,951

UNITED STATES PATENT OFFICE 2,534,951

UNIVERSAL ELECTRICAL APPARATUS

Donald Marshall Cargill, Derby, England

Application September 19, 1945, Serial No. 617,308
In Great Britain September 8, 1944

8 Claims. (Cl. 74—472)

This invention relates to universal electrical or similar apparatus of the kind in which an electric motor or the like is so mounted and means is provided whereby the one motor may be employed to drive a variety of appliances.

The object of the invention is to provide a portable apparatus which can be readily connected with any convenient source of power and used to drive a very wide range of appliances of a rotary character. The invention is also directed to the provision of an apparatus which will allow of appliances being driven at different speeds, and to the provision of means whereby any appliance which is connected with the apparatus will automatically be driven at the appropriate required speed, and cannot inadvertently through carelessness or ignorance be wrongly connected up so that it will be driven at any speed other than the one for which it is intended.

Referring to the drawing which forms a part of this specification, and which is a part sectional side elevation, the appliance comprises two main parts, a first part 10 comprising a handle grip and a second part 11 comprising a cylindrical casing. The handle grip is detachably connected with the casing. If required locking means may be provided to secure the handle grip to the casing, for example a ring may be mounted on the handle grip and provided with an internal screw-thread to engage with a similar thread on the casing. At this end of the casing there are electrical plug contacts 12 to engage socket contacts 13 in the handle grip, the sockets 13 being connected by wires 14 with any suitable source of current supply, under the control of a switch 15 which is shown in the form of a trigger but which may be of any other suitable type, and which may be operatively connected with an indicator to show the position of the switch as is well known in the art. The plugs 12 feed the current to an electric motor mounted within the casing, the spindle 16 (which is shown broken off) being driven by the motor. The motor may be of universal type and may be an adjustable speed motor. Within the casing is fixed a bearing member 17 and the outer end of the casing has a conical head or extension 18 which also acts as a bearing member. The bearing member 17 receives the end of the motor spindle 16 and a first gearing spindle 19 which is connected to the motor spindle by squared or similar engaging portions 20. The outer end of the spindle 19 is received by the head 18. The spindle 19 carries a plurality of gear wheels 21 having different numbers of teeth, which are capable of meshing with other gear wheels 22 carried by a second gearing spindle 23 which is also mounted in the bearing member 17 at its rear end. The front end of the spindle 23 is squared and fits within an internally squared sleeve 24 mounted in a rotatable manner in the head 18. The spindles 16, 19 and 23 and the sleeve 24 rotate in bushings 25 which are preferably of the oil-impregnated self-lubricating type. The sleeve 24 has spring-loaded pins 26 whose inner ends cooperate with a groove or recesses 27 in the spindle of the tool or device to be driven, which is also of square shape and fits into the sleeve 24 as shown at 28. The position on the spindle 28 of the groove 27 therefore determines the extent to which the spindle 28 can be pushed into the sleeve 24. Around the second gearing spindle 23 is arranged a coil spring 29, one end of which bears against a washer 30 and the other against the face of one of the gear wheels 22, the spring therefore tending to urge the spindle outwards, so that it bears against the end of the inserted driven spindle 28. It will be seen that the speed of the drive on the spindle 28 is automatically determined by the length of spindle beyond the groove 27; in the position shown in the drawings a long spindle has been inserted and the inner pair of gear wheels 21, 22 are in mesh, so that the speed of drive is high, for example it may be the same as the speed of the motor itself. If, however, a shorter spindle 28 is inserted, the spring 29 will urge the spindle 23 outwards, and the length of the shorter spindle 28 would be such that the outer pair of gear wheels 21, 22 would be in mesh, so that the speed of the drive would be lower, for example it might be half the speed of the motor. By increasing the number of pairs of gear wheels 21, 22 and providing appliance spindles 28 of the appropriate alternative lengths, the available range of speeds can be increased indefinitely, but it is considered that two speeds will be sufficient for most requirements. By these means it can be ensured that each appliance to be driven will in fact be driven at the appropriate speed since the length of the spindle 28 will automatically determine the speed. The spindle 28 may be fitted to the appliance in any convenient way, or may be the actual spindle of the appliance itself. Where a range of spindles of different lengths are available it is preferred to arrange so that they will only fit appliances which require to be driven at the speed appropriate to the length of each particular spindle.

It has heretofore been assumed that the power unit is an electric motor, but in fact the electric motor may be replaced by any other form of power unit which is suitable, for instance a power unit of a pneumatic type such as an air compressor, and such terms as "electrical apparatus" used herein are to be interpreted accordingly.

It is unnecessary to give an exhaustive list of the appliances which can be driven by the use of the device, but among others may be mentioned a very wide range of brushes, including brushes for cleaning and polishing, hair brushes, brushes for grooming dogs, horses and other animals, whisks and other culinary devices, vegetable or fruit peelers, polishing pads for manicure, French polishing and other purposes, butter churns, holders for cleaners for kitchen utensils and the like, abrasive elements, rotary combs for stripping dogs or for cloth nap-raising and the like, and a variety of other devices. By providing a suitable stand for the device preferably adjustable as to height and angle, the device can be used to drive fans, sewing machines, refrigerators, mincing machines, or coffee grinders. Again, it may be preferred to secure to the spindle 28 an element which is subjected to a reciprocating motion, and which may also be derived from the motor, when the device could be used to drive such elements as paint stipplers, knitting shuttles or knitting tools of various kinds, bread saws, punches and so forth. In addition it may be required to provide for the heating of an electrical element in the part to be driven, for example, hair driers or other rotary heated appliances. It is not intended that this list is by any means exhaustive as other uses will readily suggest themselves. Again, the list of uses has been largely of a domestic character, and the device can be used also in workshops or industrial establishments for driving a wide variety of tools or implements.

Having now described my invention, what I claim as new and desire to secure by Letters Patent is:

1. A mechanism for imparting rotary movement to a driven element including variable speed gearing, a slidably movable rotary driving element operated by said gearing, the change-speed of the gearing being effected by the slidable movement of said driving element, a sleeve actuated by the driving element, means to operatively connect the driven element to the sleeve, means for determining the axial position of the driven element relative to the sleeve, and means for urging the driving element against the end of the driven element.

2. A mechanism including a drive spindle, a rotary driving element adapted to be driven by said spindle, complementary gears of different size carried by said spindle and driving element, the driving element being capable of sliding movement relative to the drive spindle, and a driven element operatively engaged by said driving element in a removable manner, the length of said driven element beyond the point of where said driven element is engaged by the driving element acting upon said driving element to determine the particular gears through which the drive is obtained.

3. In an apparatus for imparting rotary movement to a tool, a casing, a drive spindle within the casing and having at least two gears of different size associated therewith, a tool holder mounted for rotary movement within the casing, a spindle having at least two gears of different size thereon capable of meshing with the gears on the drive spindle adapted to engage the holder and have sliding movement relative to said holder, and a plurality of tools provided with shanks of different length, the arrangement being such that the length of the shank of the tool inserted in the holder determines the particular gears through which the tool will be driven.

4. An apparatus as claimed in claim 3 wherein spring means cooperates with the spindle to urge said spindle against the shank of the tool in the holder.

5. An apparatus as claimed in claim 3 wherein the tool holder and shank of the tool are provided with complemental means for positioning the tool relative to the spindle.

6. An apparatus as claimed in claim 3 wherein the shank of the tool is provided with a recessed area adapted to receive a spring loaded member carried by the tool holder to position the tool correctly with relation to the spindle.

7. In an apparatus for imparting rotary movement to a tool, a drive spindle, a gear spindle operatively connected with said drive spindle, gear wheels of different size carried by the gear spindle, a slidably mounted gear spindle, gear wheels of different size mounted on said last named spindle and capable of meshing with the wheels on the first named gear spindle, a plurality of tools provided with shanks of different length, and means to operatively connect one of said tool shanks with the slidably mounted spindle, the arrangement being such that the axial position of the slidable spindle is automatically selected by the length of the tool shank thereby determining the gear wheels through which the tool will be driven.

8. In an apparatus for imparting rotary movement to a tool having a casing, a handle detachably connected thereto, an electric motor within the casing, cooperating contacts between the handle and the casing, and means for supplying current to the contacts, the improvement including a drive spindle, a gear spindle operatively connected with the drive spindle, gears of different size carried by the gear spindle, a slidably mounted gear spindle, gear wheels of different size mounted on said last named spindle and capable of meshing with the wheels on the first named gear spindle, a sleeve adapted to be engaged and actuated by said slidably mounted gear spindle, a plurality of tools provided with shanks of different lengths, means to operatively connect one of said tool shanks with said sleeve, and spring means for urging the slidably mounted gear spindle against the end of said tool shank, the arrangement being such that the position of the slidable spindle is automatically selected by the length of the tool shank thereby determining the gear wheels through which the tool will be driven.

DONALD MARSHALL CARGILL.

REFERENCES CITED

The following references are of record in the file of this patent:

UNITED STATES PATENTS

| Number | Name | Date |
|---|---|---|
| 1,281,629 | Monahan | Oct. 15, 1918 |
| 1,384,811 | Strand | July 19, 1921 |
| 1,475,153 | Athenas | Nov. 20, 1923 |
| 1,482,715 | Strand | Feb. 5, 1924 |
| 1,611,042 | Johnston et al. | Dec. 14, 1926 |
| 1,734,406 | Strand | Nov. 5, 1929 |
| 1,846,879 | Kurth | Feb. 23, 1932 |
| 2,162,251 | Emrick | June 13, 1939 |
| 2,234,962 | Cislak | Mar. 18, 1941 |
| 2,273,626 | Connell | Feb. 17, 1942 |
| 2,277,614 | Suhner | Mar. 24, 1942 |
| 2,370,872 | Miller et al. | Mar. 6, 1945 |